(12) United States Patent
Kim

(10) Patent No.: US 8,240,526 B2
(45) Date of Patent: Aug. 14, 2012

(54) ROOF SIDE BAR FOR PREVENTION OF NOISE FOR AUTOMOBILE

(75) Inventor: Jin Yi Kim, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 816 days.

(21) Appl. No.: 12/336,307

(22) Filed: Dec. 16, 2008

(65) Prior Publication Data

US 2010/0059562 A1    Mar. 11, 2010

(30) Foreign Application Priority Data

Sep. 9, 2008  (KR) .................. 10-2008-0088759

(51) Int. Cl.
*B60R 9/05* (2006.01)
*B60R 9/04* (2006.01)

(52) U.S. Cl. ........................ 224/316; 224/309

(58) Field of Classification Search ............... 224/316, 224/322, 325, 309, 321; 296/210
See application file for complete search history.

(56) References Cited

U.S. PATENT DOCUMENTS

| | | | |
|---|---|---|---|
| 3,613,830 A * | 10/1971 | Hubbell, III | 181/266 |
| 4,364,500 A * | 12/1982 | Bott | 224/325 |
| 5,294,033 A * | 3/1994 | Duemmler | 224/316 |
| 6,276,747 B1 * | 8/2001 | Ogawa et al. | 296/180.1 |
| 6,779,696 B2 * | 8/2004 | Aftanas et al. | 224/315 |
| 7,089,901 B2 * | 8/2006 | Kino et al. | 123/184.57 |
| 7,419,074 B2 * | 9/2008 | Kamiya et al. | 224/321 |

* cited by examiner

*Primary Examiner* — Justin Larson
(74) *Attorney, Agent, or Firm* — Morgan, Lewis & Bockius LLP

(57) ABSTRACT

A roof side bar is configured for prevention of noise for an automobile. The roof side bar includes a cross bar mounting hole to which a cross bar may be mounted, and/or an interior space having a specific volume located behind the cross bar mounting hole, wherein a partitioning wall may be provided to divide the interior space into a plurality of subspaces so as to vary a resonant frequency in the interior space.

11 Claims, 4 Drawing Sheets

(A) [cross bar mounting hole]

(B) [through hole]

ROOF SIDE BAR FOR PREVENTION OF NOISE FOR AUTOMOBILE

CROSS-REFERENCE TO RELATED APPLICATION

The present application claims priority of Korean Patent Application Number 10-2008-0088759 filed Sep. 9, 2008, the entire contents of which application is incorporated herein for all purposes by this reference.

BACKGROUND OF THE INVENTION

1. Field of the Invention

The present invention relates to a roof side bar for prevention of noise for an automobile, and more particularly, to a roof side bar for prevention of noise for an automobile which can reduce howling noise without changing an external shape of a roof side bar.

2. Description of Related Art

Generally, a roof rack having a roof side bar is mounted onto a roof of an automobile such as a sports utility vehicle (SUV) which is recently popular.

The roof side bar is mounted for an external beauty of an automobile and also for mounting a cross bar in order to load luggage on the roof.

The cross bar which is mounted to the roof side bar may be formed as a type of grabbing the roof side, but this type has a problem in that many workers work together for changing position of the cross bar, so type of forming holes in the roof side bar and fixing the cross bar to the hole so that one person can change the position using a lever is widely used.

However, if holes are formed in the rood side bar, the roof side bar roles as a kind of a resonator, and howling noise is generated.

Howling is a phenomenon of repetition of operation that output of an electrical device is input into an input device and is amplified and then output, and is noise like ghost's cry or wolf's cry, and in order improve this, volume of an inner space of the roof side bar should be varied, and in order to vary the volume, the cross section of the rood side bar should be varied and this relates to the design so that it is not easy to vary the volume.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention have been made in an effort to provide a roof side bar for prevention of noise for an automobile which can effectively reduce noise of a specific frequency range generated in a roof side bar, and by measuring volume of the inside of the roof side bar for avoiding the specific frequency, and an inner space is limited through variation of the volume, thereby improving howling noise.

One aspect of the present invention is directed to a roof side bar for prevention of noise for an automobile, the roof side bar including a cross bar mounting hole to which a cross bar may be mounted, and/or an interior space having a specific volume located behind the cross bar mounting hole, wherein a partitioning wall may be provided to divide the interior space into a plurality of subspaces so as to vary a resonant frequency in the interior space.

The partitioning wall may be provided with a through hole fluidly communicating the subspaces which may be divided to have different frequency regions.

The interior space may include a first interior subspace communicating with a rear part of the cross bar mounting hole and a second interior subspace communicating with a rear part of the through hole, and wherein volume of the first interior subspace may be greater than that of the second interior subspace.

The cross bar mounting hole and the through hole may be formed to have different diameters.

The sizes of the cross bar mounting hole and the through hole may be 9.3 mm and 6 mm respectively.

A ratio of diameters of the cross bar mounting hole and the through hole may be 3:2.

The sizes of the cross bar mounting hole and the through hole may be 9.3 mm and 6 mm respectively.

Other aspects of the present invention are directed to vehicle roof racks including the above-described roof side bars, and further still, to passenger vehicles including such roof racks.

Another aspect of the present invention is directed to a roof side bar, including a bar defining a cross-section, the cross-section including a cross bar mounting hole configured for a cross bar to be mounted thereto, a space behind the cross bar mounting hole, and/or a partitioning wall dividing the space into a first subspace adjacent the cross bar mounting hole, and a second subspace behind the partitioning wall.

The partitioning wall may include a through hole fluidly communicating the subspaces.

The cross bar mounting hole may have a first diameter, and the through hole may have a second, different diameter.

The ratio of the first diameter to the second diameter may be approximately 3:2.

The volume of the first sub-space may be greater than a volume of the second sub-space.

The first diameter may be approximately 9.3 mm and the second diameter may be approximately 6 mm.

Other aspects of the present invention are directed to vehicle roof racks including the above-described roof side bars, and further still, to passenger vehicles including such roof racks.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
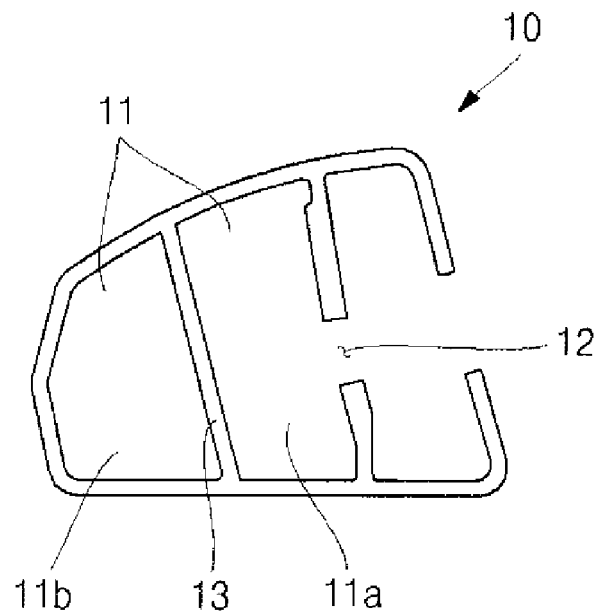
FIG. 1 is a drawing showing an exemplary roof side bar for prevention of noise for an automobile according to the present invention.
Figure 2:
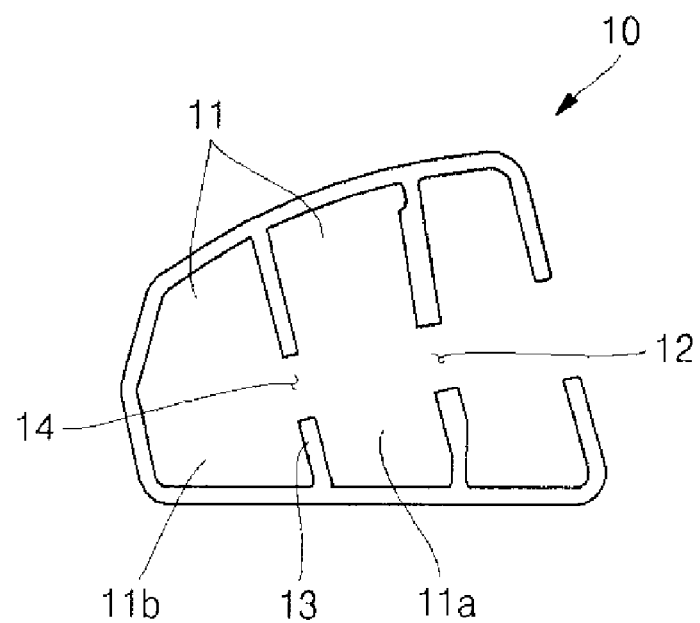
FIG. 2 is a drawing showing another exemplary roof side bar for prevention of noise for an automobile according to the present invention.
Figure 3:
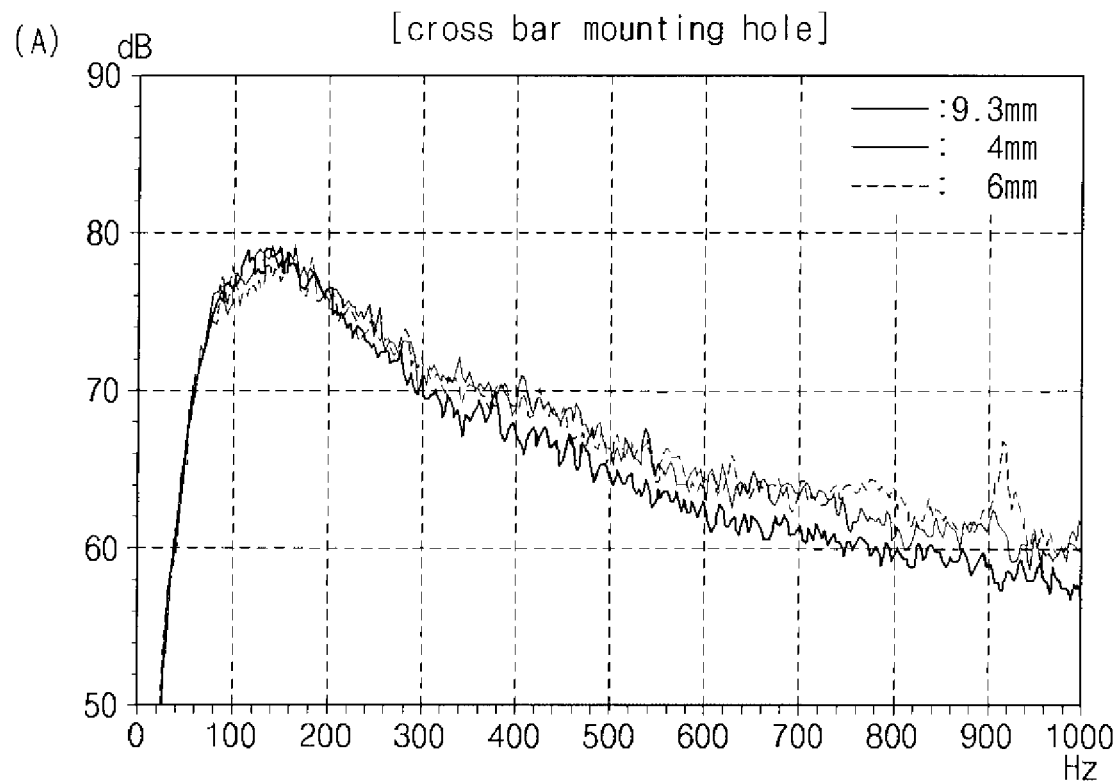
FIG. 3 is a graph showing evaluation results according to size of an exemplary cross bar mounting hole and through hole of a roof side bar for prevention of noise for an automobile according to the present invention.
Figure 3:
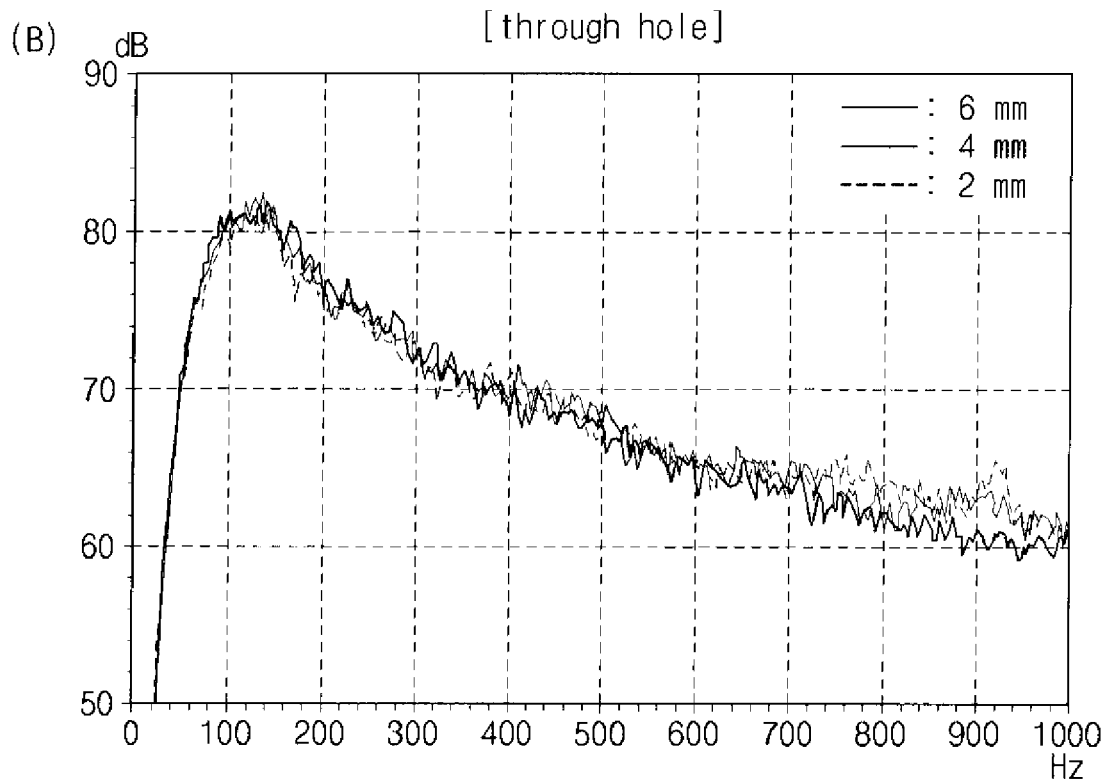

FIG. 1 is a drawing showing a roof side bar for prevention of noise for an automobile according to various embodiments of the present invention, FIG. 2 is a drawing showing a roof side bar for prevention of noise for an automobile according to other embodiments of the present invention, and FIG. 3 is a graph showing evaluation results according to size of a cross bar mounting hole and a through hole of a roof side bar for prevention of noise for an automobile according to various embodiments of the present invention.

Figure 4:
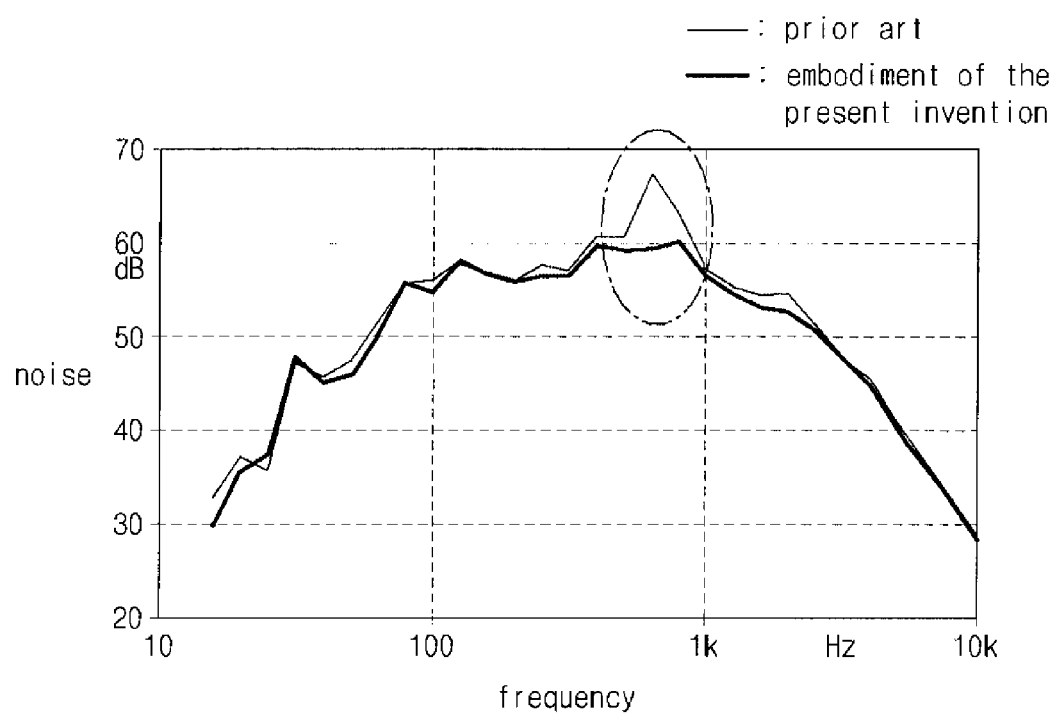
FIG. 4 is a graph showing noises in an exemplary roof side bar for prevention of noise for an automobile according to the present invention and in a conventional roof side bar.
Figure 5:
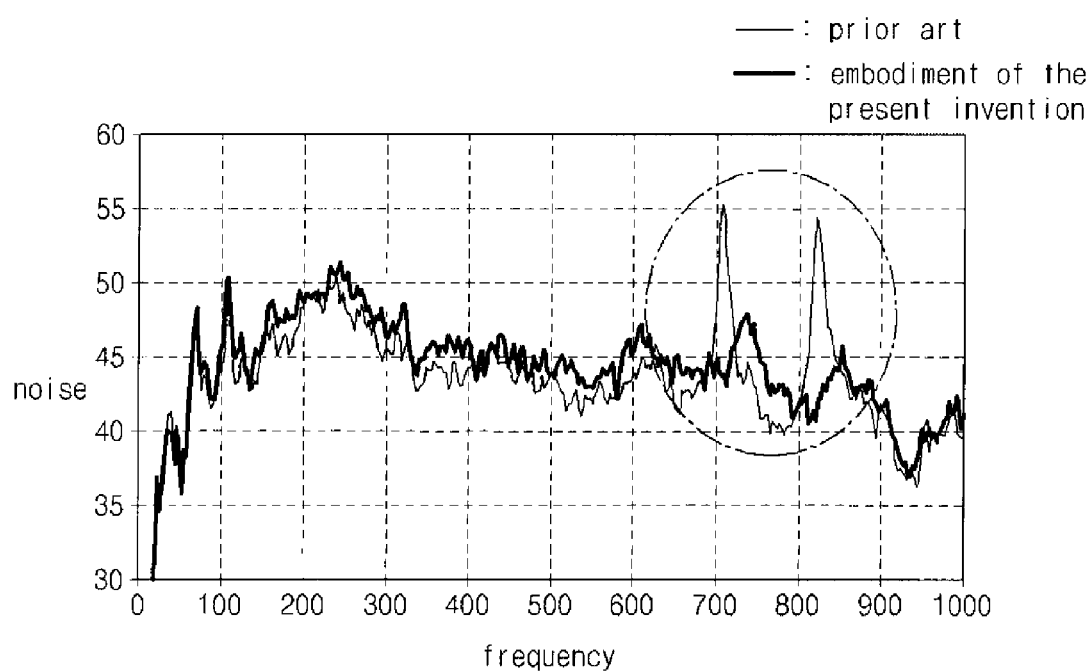
FIG. 5 is a graph showing noises in another exemplary roof side bar for prevention of noise for an automobile according to the present invention and in a conventional roof side bar.

In addition, FIG. 4 is a graph showing noises in a roof side bar for prevention of noise for an automobile according to various embodiments of the present invention and in a conventional roof side bar, and FIG. 5 is a graph showing noises in a roof side bar for prevention of noise for an automobile according to other embodiments of the present invention and in a conventional roof side bar.

The present invention provides for a means to simply reduce howling noise without changing an external shape of a roof side bar.

In order to achieve such noise reduction, the present invention allows for beforehand measuring frequency of howling noise which is generated in a roof side bar 10 and then obtaining volume in which noise can be prevented using resonant frequency equation of a general resonator.

The resonant frequency for prevention of howling noise according to the present invention may be obtained by the following equation for obtaining frequency of Helmholz resonator:

$$F_n = \frac{c}{2\Pi} \sqrt{\frac{A}{V}} \qquad \text{Equation 1}$$

Here n is a resonation vibrator, V is volume of a resonator, c is speed of sound, and volume A of an inlet of the resonator is equal to:

$$\frac{s}{l} \qquad \text{Equation 2}$$

Here s is cross sectional area of the inlet of the resonator, and 1 is effective length of the inlet.

The role of a general resonator is realized by an inside structure of the rood side bar 10. The whole of the inside of the roof side bar 10 forms a main body of the resonator having a specific volume, the cross sectional area of a cross bar mounting hole 12 forms the cross sectional area of an inlet of the resonator, the length of the cross bar mounting hole 12 forms the length of the inlet thereof, and volume of the cross bar mounting hole 12 forms the volume of the inlet. Modifying the dimension and configuration of such may remove or reduce howling noises corresponding to their resonant frequency.

In other words, after measuring the resonant frequency of the inside of the roof side bar 10, a volume for avoiding the noise generation frequency may be determined.

Volume of an interior space 11 should be in inverse proportion to a square root of the resonant frequency in order to remove noise in a resonant frequency area.

That is, the volume of the inside of the roof side bar 10 for avoiding the measured resonant frequency may be determined and the inner space may be changed according to the "volume for avoiding" so that the inner space has different frequency area, a partitioning wall 13 for dividing an inner space is integrated in the interior space 11 which is formed behind the cross bar mounting hole 12 which is formed at the roof side bar 10.

Change in the volume of the interior space 11 induces change of specific resonant frequency, the volume of the interior space 11 is in inverse proportion to the resonant frequency, so in order to lower the resonant frequency the volume of the interior space 11 should be increased, and in order to increase the resonant frequency the volume of the interior space 11 should be decreased.

As such, in case that the partitioning wall 13 is provided to the interior space 11 of the roof side bar 10, change in specific resonant frequency which is generated inside the roof side bar 10 is induced so as to reduce howling noise.

Such a result is illustrated by the graph shown in FIG. 4, and in which a noise reduction effect of about 10 dB at a specific frequency (1 k Hz) may be obtained.

Meanwhile, FIG. 2 shows a roof side bar 10 for prevention of noise for an automobile according to other embodiments of the present invention. An inner space of the roof side bar 10 is formed as plural resonators, and as shown in the drawing, a through hole 14 communicating the divided two spaces is perforated at the partitioning wall 13 which divides the inner volume of the interior space 11, thereby forming a first interior space 11a which communicates with the rear side of the through hole 14 and a second interior space 11b which communicates with the rear side of the through hole 14 as a pair of resonators such that resonant frequencies generated in the resonators can be offset.

By differently setting conditions in the above-mentioned equation, in other words, by regulating cross sectional area and length of the cross bar mounting hole 12 and the through hole 14 thereby changing volume, the resonator frequency can be varied, so the first interior space 11a has a bigger space and the second interior space 11b has a relatively smaller volume, so that the resonator frequency increases when it approaches to the second interior space 11b.

This is a type in which resonators are arrange to have booming spaces with different volumes, i.e., to have a plurality of resonant frequencies thereby offsetting the mutual resonant frequencies, and thereby howling noise in the roof side bar 10 can be prevented.

At this time, if diameters of the cross bar mounting hole 12 and the through hole 14 are formed at the same hole size by the conventional manufacturing method, length of a drill bit needs to be longer in hole forming process so that the drill bit may rotate abnormally and this may cause an upper part of the cross bar mounting hole 12 to be wider, so it is impossible to form the cross bar mounting hole 12 and the through hole 14 at the same size, and therefore in case of mounting a cross bar (not shown) to the roof side bar 10, the cross bar may move freely so as not to be firmly mounted, and thus it is preferable to form the cross bar mounting hole 12 and the through hole 14 to have different diameters so as to effectively offset the resonant frequency.

Accordingly, in various embodiments of the present invention, it is preferable that diameters of the cross bar mounting hole 12 and the through hole 14, as shown in FIG. 3, are 9.3 mm and 6 mm respectively.

That is, the size of the cross bar mounting hole 12 is determined in consideration of a structural strength, a manufacturing method, or the like in an early design step, and is 9.3 mm in most automobiles currently developed, and if case that the size of the cross bar mounting hole 12 is less than 9.3 mm, whistle noise is generated instead of howling noise, and this is worse than the howling noise.

On the other hand, in case that the size of the cross bar mounting hole 12 is greater than 9.3 mm, size of a rail of the side bar is increased, and accordingly the cross bar itself becomes larger, so the optimal size of the cross bar mounting hole 12 is 9.3 mm under the current shape.

Accordingly, as a result of test, a ratio of diameters of the cross bar mounting hole 12 and the through hole 14, as shown in FIG. 3, is 3:2.

That is, when the size of the through hole 6 mm in case that the size of the mounting hole is 9.3 mm, the effect is maximized.

This result may be known from the graph shown in FIG. 5, and noise reduction effect of about 10 dB at the specific frequency (700~800 Hz) can be obtained.

As mentioned above, in a roof side bar for prevention of noise for an automobile according to the present invention, howling noise is improved so that dissatisfaction of consumers can be resolved and the product attractiveness of an automobile can be enhanced.

For convenience in explanation and accurate definition in the appended claims, the terms "upper", "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A roof side bar comprising two interior spaces separated by a first partitioning wall,
    wherein the first partitioning wall includes a cross bar mounting hole formed thereon for mounting a cross bar thereto, an interior space being formed behind the cross bar mounting hole and divided into a plurality of subspaces by a second partitioning wall so as to vary a resonant frequency in the interior spaces,
    wherein the second partitioning wall is provided with a through hole fluidly communicating the subspaces which are divided to have different frequency regions, and
    wherein a ratio of diameters of the cross bar mounting hole and the through hole is 3:2.

2. The roof side bar of claim 1, wherein the interior space comprises a first interior subspace communicating with a rear part of the cross bar mounting hole and a second interior subspace communicating with a rear part of the through hole, and wherein volume of the first interior subspace is greater than that of the second interior subspace.

3. The roof side bar of claim 1, wherein sizes of the cross bar mounting hole and the through hole are 9.3 mm and 6.2 mm respectively.

4. A vehicle roof rack comprising the roof side bar of claim 1.

5. A passenger vehicle comprising the roof rack of claim 4.

6. A roof side bar, comprising:
    a bar defining a cross-section, the cross-section including:
    a cross bar mounting hole configured for a cross bar to be mounted thereto; and
    an interior space behind the cross bar mounting hole;
    wherein the interior space is divided into a first subspace adjacent the cross bar mounting hole, and a second subspace behind the first subspace by a partitioning wall;
    wherein the cross bar mounting hole has a first diameter, and the through hole has a second diameter; and
    wherein a ratio of the first diameter to the second diameter is 3:2.

7. The roof side bar of claim 6, wherein the partitioning wall comprises a through hole fluidly communicating the subspaces.

8. The roof side bar of claim 6, wherein a volume of the first sub-space is greater than a volume of the second sub-space.

9. The roof side bar of claim 6, wherein the first diameter is approximately 9.3 mm and the second diameter is 6.2 mm.

10. A vehicle roof rack comprising the roof side bar of claim 6.

11. A passenger vehicle comprising the roof rack of claim 10.

* * * * *